Patented Nov. 19, 1929

1,736,027

UNITED STATES PATENT OFFICE

EDWARD T. WILLIAMS, OF BROOKLYN, NEW YORK

THERMOSTATIC-CIRCUIT CONTROLLER

Application filed March 10, 1923. Serial No. 624,219.

In refrigerating machines for use in private households, small hotels, restaurants, and the like, the compressor by which the refrigerant evaporated in the expansion chamber is compressed for liquefaction is usually actuated by an electric motor driven by current derived from the lighting system or other source. For the sake of economy in current consumption it is desirable that the motor should be in operation only as required to maintain the proper low temperature in the refrigerator or other chamber employed, and accordingly the common practice is to put the motor circuit under the control of the temperature in the refrigerator, a thermostatic device being provided to open the motor circuit when the temperature has fallen to a predetermined minimum and to close the circuit, and thereby set the machine in operation, whenever the temperature rises above a predetermined maximum.

Moreover, in household refrigerating machines certain other features are highly important, as for example low initial cost, unfailing reliability in operation, and low cost of upkeep. This includes the thermostatic motor-control, which means that the device employed for that purpose must also be inexpensive, reliable, and sturdy and durable enough to last for an indefinite time without adjustment, repair, or other attention, and withal possess the sensitiveness and delicacy of operation necessary to maintain the desired temperature. Accordingly the prime object of my present invention is to provide for the purpose a thermostatic-controlling device possessing these important characteristics. Another object is to provide a device in which adjustment and repairs can be easily effected whenever necessary or desirable. To these and other ends the invention consists in the novel features hereinafter described.

Referring to the accompanying drawings.

Figure 1:
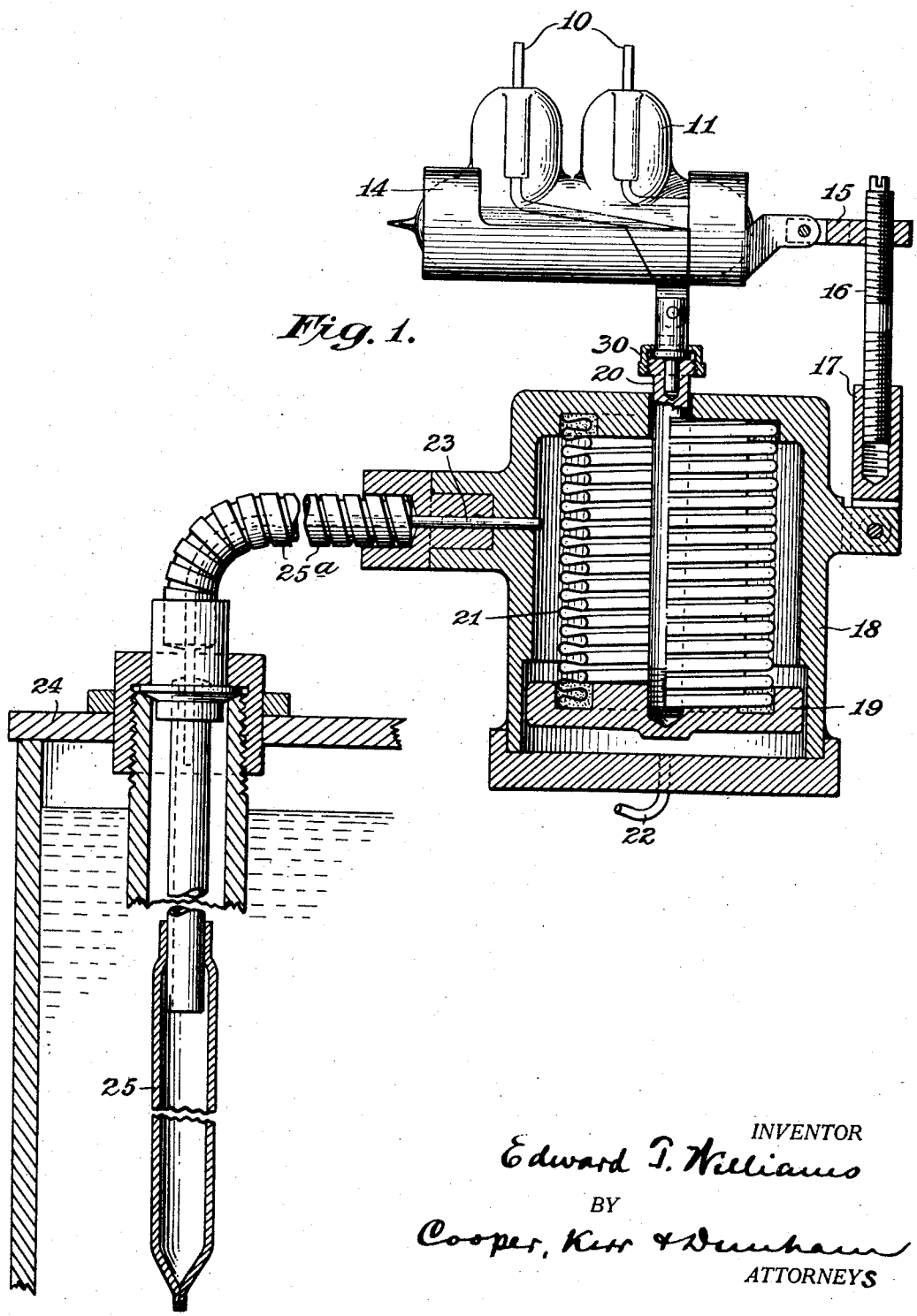
Fig. 1 is a vertical section illustrating my invention in its preferred form.
Figure 2:
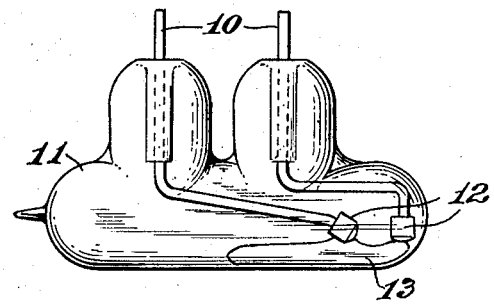
Fig. 2 is a detail side view of the switch or circuit-breaker.

Referring first to Figs. 1 and 2, 10 designates the ends of two electric conductors, which may represent the external circuit of an electric motor for driving the refrigerating compressor, or any other circuit which is to be controlled thermostatically. The conductors are sealed in a tube or bulb 11 of glass or other suitable insulating material, and are provided with spaced terminals 12 inside of the bulb, arranged in position to make contact with a globule or small body of mercury 13. It will be seen that when the bulb is in the position shown in Fig. 2 the terminals 12 are in contact with the mercury and hence are electrically connected. The circuit represented by the conductor 10 is thus closed. On the other hand if the tube is tilted counter-clockwise the mercury will flow away from one or both terminal contacts and thereby break the circuit. The tube may be exhausted of air and filled with nitrogen or other inert gas under suitable pressure, to prevent oxidation of the mercury and minimize arcing when the circuit is opened and closed. The mercury constitutes a convenient and effective form of contact which is freely movable in the tube to make and break the circuit as the position of the tube is varied.

For the purpose of tilting the tube 11 in response to temperature changes, it is mounted in a sheet metal cradle 14, which is pivoted at one end to a collar 15 on a threaded support 16 which is itself threaded in an arm 17 pivoted on one side of a casing 18 preferably of cylindrical form. Inside of the casing is a piston 19 having adjustably threaded therein a vertical stem 20 extending out of the casing into pivotal connection with the cradle 14. Around the stem is an expansible and contractible bellows 21, made of resilient sheet metal, the upper end of which is soldered or otherwise hermetically sealed to the top of the casing. The lower end is similarly sealed to the piston 19, which, it is to be understood, serves chiefly as a lower guide for the stem 20 and fits the chamber 18 loosely enough to permit free communication between the space below the piston and the space above, outside of the bellows. In the bottom of the casing or pressure chamber is a small tube 22 by which the chamber (around the bellows and below the piston) can be charged with liquid sulfur dioxid or other liquid gas of suitable boiling point.

Assuming that the pressure chamber 18 is exposed to the temperature changes which control the circuit 11 it will be seen that as the temperature falls, the resulting decrease of pressure in the chamber will permit the bellows 21 to expand, thereby depressing the stem 20 and rocking the bulb or tube 11 counterclockwise. This breaks the circuit, as already explained. Similarly, if the temperature rises the pressure in the casing is inceased, thereby collapsing the bellows and tilting the bulb clockwise. This closes the circuit.

The device may be located in the refrigerator or other chamber or space in which the temperature is to be controlled or it may be thermally associated therewith in any other convenient and suitable manner. If the thermostatic device is located at a remote point, as for example on top of the refrigerator, the necessary thermal connection may be made by means of a tube 23 sealed in the side of the cylinder 18 and extending into the refrigerator, and preferably into the tank (represented by a portion of its top shown in section at 24) containing the brine in which the expansion chamber (not shown) is immersed. The end immersed in the brine is preferably enlarged, as indicated at 25, so as to contain a substantial portion of the sulfur dioxide gas with which the system is charged. In practice it is preferable to maintain in the brine tank a temperature at which the sulfur dioxide will condense, in which case the enlarged portion or bulb 25 will contain nearly all the gas, in liquid form. The part of the tube outside of the brine tank may be armored or enclosed in flexible metal tubing 25$^a$ to protect it against damage.

In the device illustrated in Fig. 1 the thermostatic bellows is open to the atmosphere and is immersed in the temperature-responsive gas, inside of a casing having walls of substantial thickness, and is intended particularly for remote control. If the apparatus is to be exposed directly to the temperature changes the construction illustrated in Fig. 3 is preferred, though it is to be understood that this form of the invention also can be used at a more distant point.

Figure 3:
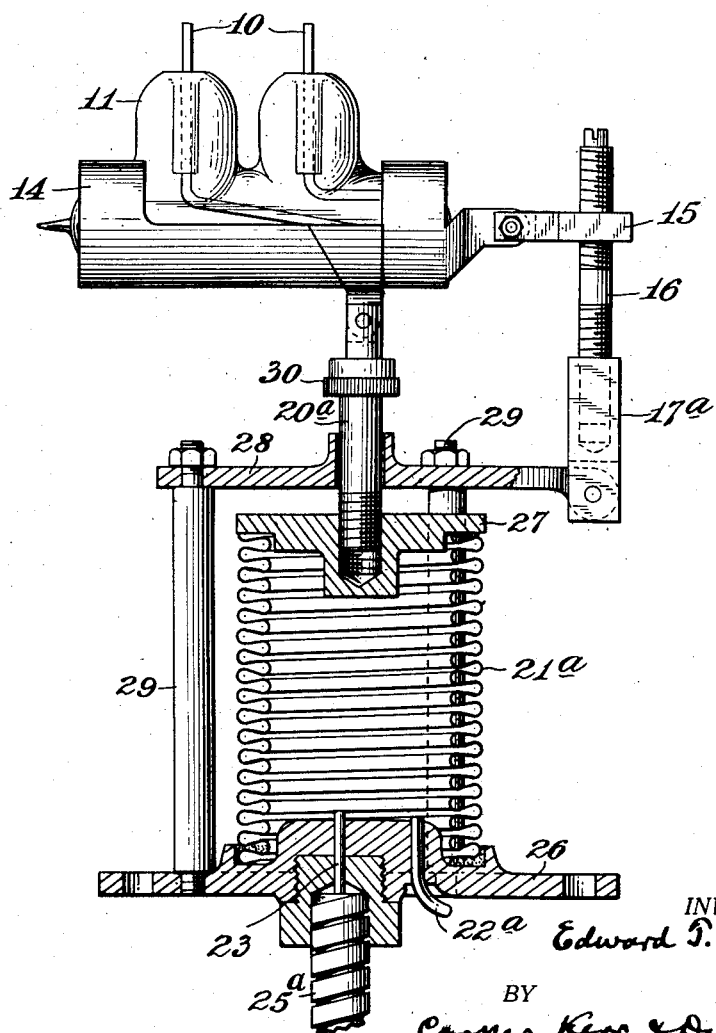
Fig. 3 is a vertical section illustrating a modification of the embodiment shown in Fig. 1.

In the construction shown in Fig. 3 the bellows 21$^a$ is sealed at its bottom on a base 26 and at its top to a head 27 which carries the stem 20$^a$. The latter is guided in an upper plate 28, which also provides support for the pivoted arm 17$^a$ in which the threaded support 16 is mounted. The plate 28 is mounted on the base 26 by means of three vertical bolts 29, of which two are shown. These bolts also serve to guide the bellows and prevent buckling thereof, the plates 26 and 28 and bolts or spacing pieces 29 constituting in effect a casing like the chamber 18 in Fig. 1 to the extent of supporting the bellows and guiding the stem 20$^a$. Also, the heads 19 and 27 afford suitable connection between the bellows 21, 21$^a$, and the stems 20, 20$^a$, respectively. A charging tube 22$^a$ is provided, in the base 26. If the device is directly exposed to the temperature changes by which the circuit is to be controlled no provision need be made for the gas tube 23; or the latter can be omitted and the aperture closed by a plug or other hermetic seal.

Adjustment of the device is easily effected by turning the threaded support 16 in the collar 15 and arm 17, thereby raising or lowering the collar, or by raising or lowering the stem 20 or 20$^a$. If, at the temperature which is to be maintained, the switch bulb 11 is not tilted counterclockwise far enough to break the circuit the supporting collar is raised or the actuating stem lowered. Contrariwise, if the tube is not tilted clockwise far enough to close the circuit when the temperature has risen to the predetermined maximum the collar is lowered or the stem raised. Preferably the threaded stem or support 16 has left hand threads on one end and right hand threads on the other, so that needed adjustments can be made with less movement of the support itself. To permit the rotation necessary for vertical adjustment of the actuating stem the latter is made in relatively rotatable parts held together in axial alignment by a flanged collar 30, as shown in Figs. 1 and 3, permitting the lower part of the stem to be turned without disturbing the connection with the cradle 14, as will be readily understood.

It is to be understood that the invention is not limited to the specific constructions herein illustrated and described but can be embodied in other forms without departing from its spirit.

I claim—

1. In a thermostatic circuit-controlling device, in combination, an element comprising a casing having an opening in a wall thereof, a stem adapted to reciprocate freely through said opening, an element comprising an axially expansible and contractible bellows inside of the casing, one end of the bellows being closed and connected with the stem to actuate the same and the other end being hermetically sealed to a wall of the casing, one of said elements containing a fluid responsive to temperature changes to cause expansion and contraction of the bellows and corresponding actuation of the stem, an arm pivotally mounted on the casing, and a contact-element pivotally and adjustably mounted on the said arm and pivotally connected with the stem so as to be rocked thereby.

2. In a thermostatic circuit-controlling device, in combination, a casing having an opening in a wall thereof, a stem inside of the casing and extending out of the same through said opening for free reciprocation therethrough, an arm pivotally mounted on the casing, a contact-element pivotally carried by the arm and pivotally connected with said stem whereby the contact element may be rocked in opposite directions as the stem is advanced and retracted, an axially expansible and contractible bellows inside of the casing and surrounding the stem, one end of the bellows being closed and connected with the stem to actuate the same and the other end being hermetically sealed to the casing wall around the opening therein, said casing containing a fluid in which the bellows is immersed whereby expansion and contraction of the fluid will cause contraction and expansion of the bellows and corresponding advance and retraction of the piston.

3. In a circuit-controlling device, in combination, an element comprising a casing having an opening in a wall thereof, a stem inside of the casing and extending out of the same through said opening for free reciprocation therethrough, an element comprising an axially expansible and contractible bellows inside of the casing, one end of the bellows being closed and connected to the stem to actuate the same and the other end being hermetically sealed to a wall of the casing, one of said elements containing a fluid whereby change in the volume of the fluid will cause contraction or expansion of the bellows and corresponding advance or retraction of the stem, and a pivoted contact element connected with the stem for actuation thereby in harmony with change in volume of said fluid and having a gravity-actuated member for opening and closing an electric circuit; a fulcrum for the contact element whereby actuation of the latter by said stem varies its inclination for movement of the gravity-actuated member; and means for shifting the fulcrum to vary the normal position of the contact element relative to the horizontal.

In testimony whereof I hereto affix my signature.

EDWARD T. WILLIAMS.